(12) United States Patent
Ouellette et al.

(10) Patent No.: US 10,832,545 B2
(45) Date of Patent: Nov. 10, 2020

(54) SYSTEMS AND METHODS FOR INCREASING ALARM CONFIDENCE IN EAS DETECTION SYSTEMS

(71) Applicants: Glen Ouellette, Huntington Beach, CA (US); John C. Y. Huang, Irvine, CA (US); Steve E. Trivelpiece, Rancho Santa Margarita, CA (US); Ian Westmacott, Tewksbury, MA (US)

(72) Inventors: Glen Ouellette, Huntington Beach, CA (US); John C. Y. Huang, Irvine, CA (US); Steve E. Trivelpiece, Rancho Santa Margarita, CA (US); Ian Westmacott, Tewksbury, MA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/259,847

(22) Filed: Jan. 28, 2019

(65) Prior Publication Data

US 2020/0242904 A1     Jul. 30, 2020

(51) Int. Cl.
*G08B 13/24* (2006.01)
*G06K 9/00* (2006.01)
*H04N 7/18* (2006.01)

(52) U.S. Cl.
CPC ....... *G08B 13/248* (2013.01); *G06K 9/00771* (2013.01); *G08B 13/2445* (2013.01); *G08B 13/2454* (2013.01); *G08B 13/2462* (2013.01); *G08B 13/2482* (2013.01); *G08B 13/2417* (2013.01); *H04N 7/181* (2013.01)

(58) Field of Classification Search
CPC .................................................. G08B 13/248
See application file for complete search history.

(56) References Cited

U.S. PATENT DOCUMENTS

| 9,407,878 | B2* | 8/2016 | Buehler | G08B 13/19602 |
| 9,443,407 | B2* | 9/2016 | Davidson | G06K 7/10356 |
| 9,881,216 | B2* | 1/2018 | Buehler | G08B 13/19602 |
| 2002/0011933 | A1* | 1/2002 | Andersen | G07G 1/0054 340/572.1 |
| 2006/0175402 | A1* | 8/2006 | Maitin | G06Q 20/20 235/383 |
| 2018/0365952 | A1* | 12/2018 | De Las Heras Villalon | G06K 7/1417 |

* cited by examiner

*Primary Examiner* — Qutbuddin Ghulamali
(74) *Attorney, Agent, or Firm* — Arent Fox LLP (57) ABSTRACT

Systems and methods for operating an EAS detection system. The methods comprise: detecting an Active Security Tag ("AST") in an EAS detection zone; determining whether AST is coupled to an object identified in a list; and performing operations when a determination is made that AST is coupled to a listed object. The operations involve: accessing sensor data generated by at least one sensor device disposed on/near display equipment associated with the listed object; processing the sensor data to determine whether a person was within a defined distance range of AST during a period of time immediately preceding the detecting; concluding that a false alarm scenario exists when the sensor data indicates that a person was not within the defined distance range of AST during the period of time; and suppressing alarm issuance by the EAS detection system in response to the false alarm scenario conclusion.

22 Claims, 11 Drawing Sheets

| White List Table 1000 | | | | |
|---|---|---|---|---|
| Display Equipment $108_1$ | Zone 906 | Object $102_1$ | Security Tag $104_1$ | |
| Tag Reader $110_1$ | Zone 908 | Object $102_2$ | Security Tag $104_2$ | |
| Sensor $112_1$ | | | | |
| Camera $106_1$ | | | | |
| Camera $106_2$ | | | | |
| Display Equipment $108_2$ | Zone X | Object $102_N$ | Security Tag $104_N$ | |

SYSTEMS AND METHODS FOR INCREASING ALARM CONFIDENCE IN EAS DETECTION SYSTEMS

BACKGROUND

Statement of the Technical Field

The present solution relates generally to Electronic Article Surveillance ("EAS") detection systems. More particularly, the present solution relates to systems and methods for increasing alarm confidence in EAS detection systems.

Description of the Related Art

EAS detection systems generally comprise a tag reader for transmitting interrogation signals into an EAS detection zone (or interrogation zone) and for receiving response signals transmitted from RFID tags in response to the interrogation signals. The EAS detection system issues an alarm when a response signal is received from one or more RFID tags. The alarm indicates the presence of an RFID tag in the interrogation zone. The alarm can then be the basis for initiating one or more appropriate responses depending upon the nature of the facility. Typically, the interrogation zone is in the vicinity of an exit from a facility such as a retail store, and the RFID tags can be attached to articles such as items of merchandise or inventory.

In some cases, display equipment is placed within the read area of the tag reader. Articles with active RFID tags coupled thereto are disposed on the display equipment. These active RFID tags are read by the tag reader even though they are not in the interrogation zone and/or leaving the facility. As such, false alarms are issued by the EAS detection system.

One conventional solution for solving the false alarming issue of EAS detection systems involves using a list of all articles located near exits of the facility. The EAS detections systems will not issue an alarm when RFID tags coupled to the listed articles are read thereby. However, this solution has two problems. First, these articles can be easily stolen since a person can carry the same through the interrogation zone without any alarm issuance by the EAS detection system. Second, when customers shop and move non-listed articles into proximity of the EAS detection system, false alarms are issued by the EAS detection system.

Another solution for solving the false alarming issue of EAS detection systems involves placing articles further away from the tag readers. The downside to this solution is that retailers loose valuable space at the most visible part of the retail stores (i.e., the entrances).

SUMMARY

The present disclosure generally concerns systems and methods for operating an EAS detection system. The methods comprise: detecting an active security tag in an EAS detection zone; determining whether the active security tag is coupled to an object identified in a list; and performing operations when a determination is made that the active security tag is coupled to an object identified in the list. The operations include: accessing sensor data generated by at least one sensor device (e.g., a motion sensor and/or camera) disposed on or near display equipment associated with the object identified in the list; processing the sensor data to determine whether a person was within a defined distance range of the active security tag during a period of time immediately preceding the detecting; concluding that a false alarm scenario exists when the sensor data indicates that a person was not within the defined distance range of the active security tag during the period of time; and suppressing alarm issuance by the EAS detection system in response to the false alarm scenario conclusion.

In some scenarios, the list is generated during off hours. For example, the EAS detection system performs operations to read security tags during the off hours and generate/update the list such that it includes identifiers for objects to which the read security tags are coupled. An alarm is issued by the EAS detection system when a determination is made that the active security tag is not coupled to an object identified in the list.

When a determination is made that a person was within the defined distance range of the active security tag during the period of time, the sensor data is used to classify the person as a customer or employee. A conclusion is made that a false alarm scenario exists when the person is classified as an employee. In contrast, a conclusion may be made that a real alarm scenario exists when the person is classified as a customer. However, a conclusion is made that a false alarm scenario exists when (a) the person is classified as a customer and (b) image analysis indicates that the customer is not an individual present in the EAS detection zone at the time of the detecting, that no individual was present in the EAS detection zone at the time of the detecting, and/or that the object to which the active security tag is coupled is not the same as the object present in the EAS detection zone at the time of the detecting.

In those or other scenarios, the sensor data is used to determine if an inanimate object was within a defined distance range of the active security tag during a period of time immediately preceding the detecting. A conclusion is made that a false alarm scenario exists when a determination is made that an inanimate object other than an order-fulfilling robot was within the defined distance range of the active security tag during the period of time.

BRIEF DESCRIPTION OF THE DRAWINGS

The present solution will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution provides EAS detection systems with an improved false alarm performance. The improvement in false alarming of the EAS detection systems is at least facilitated by the implementation of a novel method for increasing alarm confidence. The method involves: detecting an active security tag in an EAS detection zone; determining whether the active security tag is coupled to an object identified in a list; and performing operations when a determination is made that the active security tag is coupled to an object identified in the list. The operations include: accessing sensor data generated by at least one sensor device (e.g., a motion sensor and/or camera) disposed on or near display equipment associated with the object identified in the list; processing the sensor data to determine whether a person was within a defined distance range of the active security tag during a period of time immediately preceding the detecting; concluding that a false alarm scenario exists when the sensor data indicates that a person was not within the defined distance range of the active security tag during the period of time; and suppressing alarm issuance by the EAS detection system in response to the false alarm scenario conclusion.

In some scenarios, the list is generated during off hours. For example, the EAS detection system performs operations to read security tags during the off hours and generate/update the list such that it includes identifiers for objects to which the read security tags are coupled. An alarm is issued by the EAS detection system when a determination is made that the active security tag is not coupled to an object identified in the list.

When a determination is made that a person was within the defined distance range of the active security tag during the period of time, the sensor data is used to classify the person as a customer or employee. A conclusion is made that a false alarm scenario exists when the person is classified as an employee. In contrast, a conclusion may be made that a real alarm scenario exists when the person is classified as a customer. However, a conclusion is made that a false alarm scenario exists when (a) the person is classified as a customer and (b) image analysis indicates that the customer is not an individual present in the EAS detection zone at the time of the detecting, that no individual was present in the EAS detection zone at the time of the detecting, and/or that the object to which the active security tag is coupled is not the same as the object present in the EAS detection zone at the time of the detecting.

In those or other scenarios, the sensor data is used to determine if an inanimate object was within a defined distance range of the active security tag during a period of time immediately preceding the detecting. A conclusion is made that a false alarm scenario exists when a determination is made that an inanimate object other than an order-fulfilling robot was within the defined distance range of the active security tag during the period of time.

Illustrative System Architecture

Figure 1:
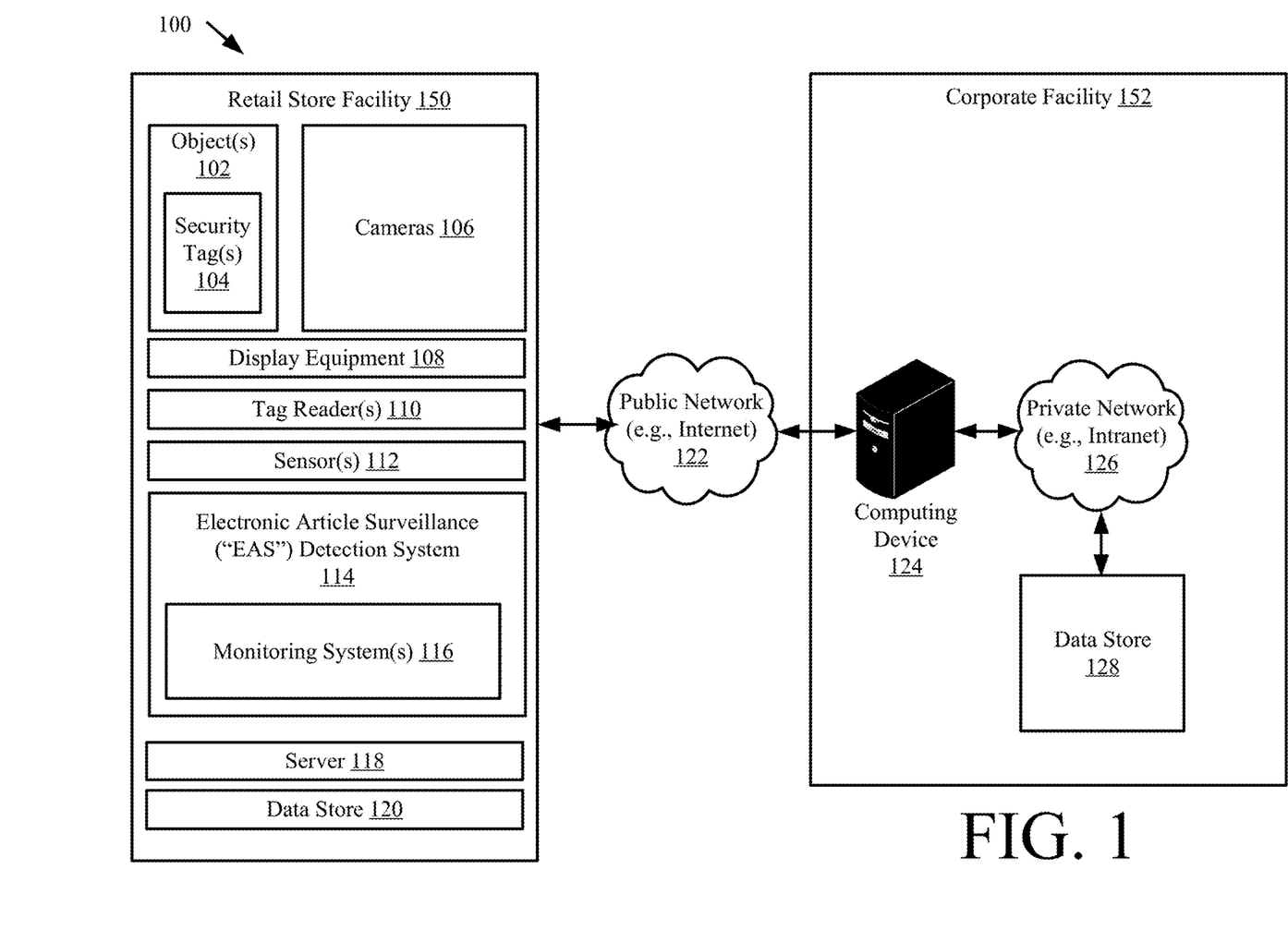
FIG. 1 is an illustration of an illustrative system.

Referring now to FIG. 1, there is shown an illustrative system 100. System 100 comprises a Retail Store Facility ("RSF") 150 and a corporate facility 152. At the RSF 150, objects 102 are offered for sale. The objects 102 can include any type of merchandise or inventory (e.g., clothing, produce, toys, electronics, etc.). The objects 102 are displayed on display equipment 108 (e.g., shelves, cabinets, tables, a rack, etc.) such that they are accessible to customers.

An EAS detection system 114 is provided to detect and mitigate theft of the objects 102 from the RSF 150. The EAS detection system 114 is described herein in terms of an RFID based EAS detection system. Other types of EAS detection systems, including systems that use AM type tags and AM EAS detection systems, can additionally be employed herein. The EAS detection system 114 comprises one or more monitoring systems 116. The monitoring system(s) 116 will be described in detail below. Still, it should be understood that the monitoring system(s) 116 is(are) configured to detect active security tags 104 within EAS detection zone(s) (e.g., near exits of RSF 150) and issue alarms when such detections are made.

Notably, system 100 is configured to identify when these alarms are false alarms. Alarm issuance is suppressed when a false alarm has been identified. Various technologies are used to identify false alarms. Such technologies include, but are not limited to, camera(s) 106, tag reader(s) 110, and/or sensor(s) 112. Cameras and tag readers are well known in the art, and therefore will not be described herein. Any known camera and/or tag reader can be used herein without limitation. For example, camera(s) 106 can include, but is(are) not limited to, a monocular camera, a stereo camera, a depth camera, and/or an Infrared ("IW") camera. The sensor(s) 112 can include, but are not limited to, motion sensor(s) (e.g., vibration sensors and/or Passive Infrared ("PIR") sensors). These devices 106, 110, 112 are placed on or adjacent to the display equipment 108 such that images/videos of activity in the vicinity of the display equipment can be captured, security tags disposed on the display equipment can be read, and/or motion of the display equipment can be detected. Time stamps are stored along with image/video data, tag read data and/or motion sensor data in a data store 120, 128. This information is used to identify false alarms by the EAS detection system 114, server 118 and/or computing device 124.

For example, when the monitoring system 116 detects an active security tag in the EAS detection zone, data generated by devices 106, 110 and/or 112 is analyzed to determine if a person was in proximity (e.g., within 1-2 feet) of the active security tag during a period of time (e.g., N minutes or hours) immediately preceding the active security tag's detection by the monitoring system 116. If not, then the alarm is considered a false alarm and issuance thereof is suppressed. In contrast if a person was in proximity of the security tag during the prescribed period of time, image analysis is performed to classify the person as a customer or employee. The person is classified as an employee when (s)he is wearing a uniform, otherwise the person is classified as a customer. The alarm is considered a false alarm when the person is classified as an employee and is considered a real alarm when the person is classified as a customer. Other ways the data generated by devices 106, 110, 112 is used to identify false alarms will become evident as the discussion progresses.

Components 106, 110, 112, 114, 118, 120, 124, 128 of system 100 communicate with each other via a public network 122 (e.g., the Internet) and/or a private network 126 (e.g., an Intranet). Servers, computing devices, public networks and private networks are well known in the art, and therefore will not be described in detail herein. Any known or to be known server, computing device, public network and/or private network can be used herein without limitation.

Figure 2:
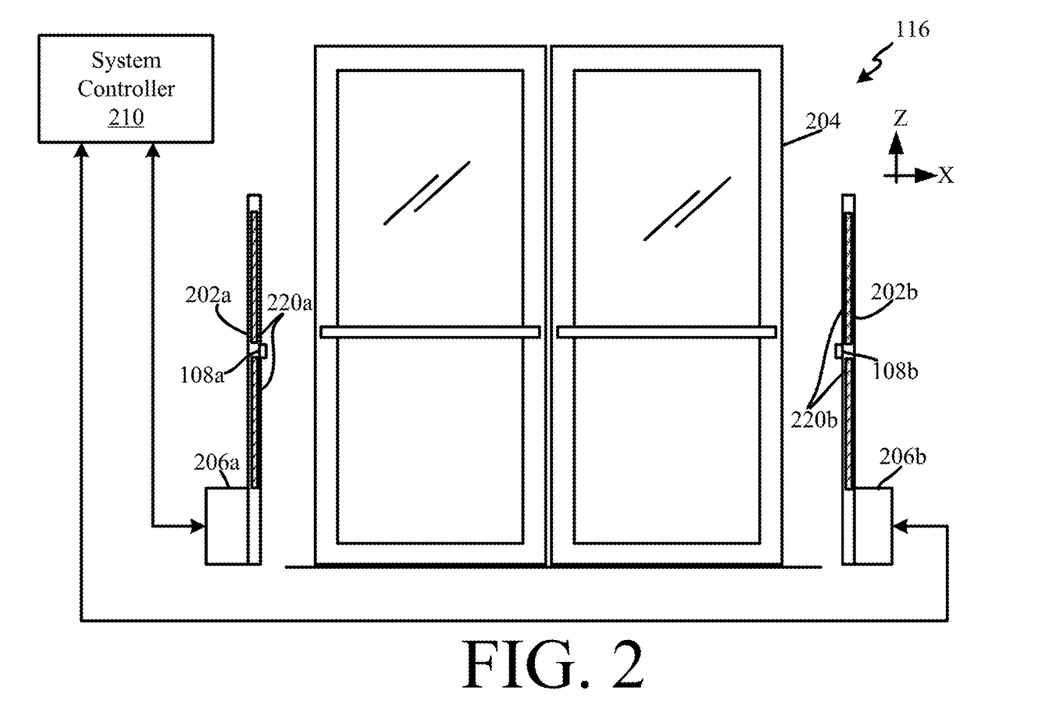
FIG. 2 is a side view of an illustrative monitoring system including in an EAS detection system.
Figure 3:
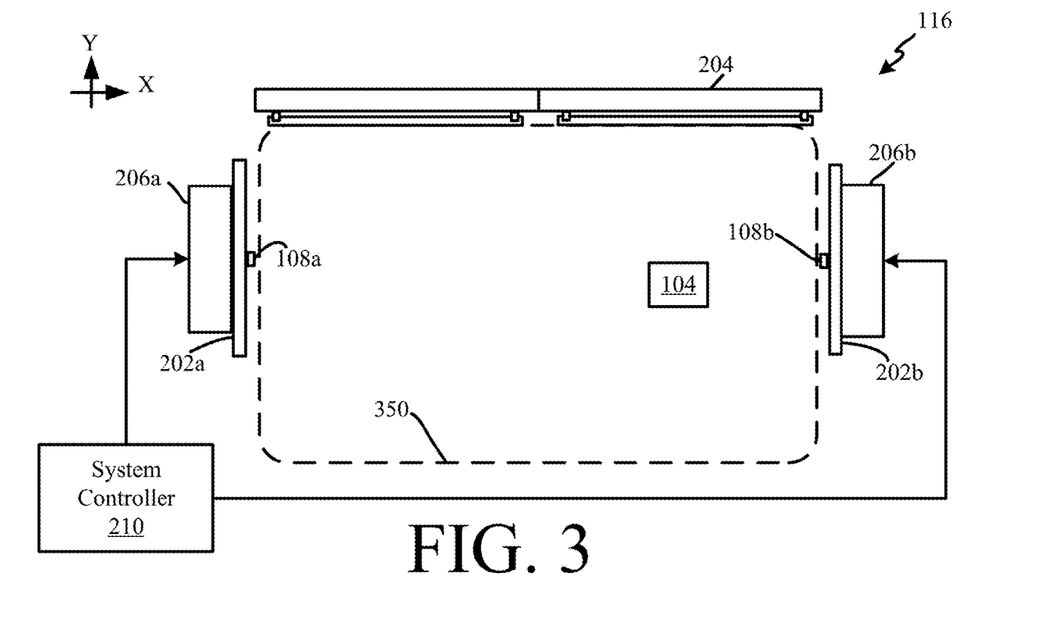
FIG. 3 is a top view of the illustrative monitoring system shown in FIG. 2, which is useful for understanding an EAS detection zone thereof.

Referring now to FIGS. 2 and 3, an illustrative architecture for the monitoring system 116 of the EAS detection system 114 is provided. The monitoring system 116 is positioned at a location adjacent to an entry/exit 204 of the RSF 150. The monitoring system 116 uses specially designed EAS marker tags ("security tags") 104 which are applied to store merchandise or other items 102 which are stored within the RSF 150. The security tags can be deactivated or removed by authorized personnel at the RSF 150. For example, in a retail environment, the security tags could be removed by store employees when a successful purchase has been performed.

When an active security tag 104 is detected by the monitoring system 116 in an idealized representation of an EAS detection zone (or interrogation zone) 350 near the entry/exit, the monitoring system 116 detects the presence of such security tag and issues an alarm. Accordingly, the monitoring system 116 is arranged for detecting and preventing the unauthorized removal of articles or products from controlled areas.

The monitoring system 116 includes a pair of pedestals 202a, 202b, which are located a known distance apart (e.g., at opposing sides of an entry/exit 204). The pedestals 202a, 202b are typically stabilized and supported by a base 206a, 206b. The pedestals 202a, 202b will each generally include one or more antennas that are suitable for aiding in the detection of the special EAS security tags, as described herein. For example, pedestal 202a can include at least one antenna 220a suitable for transmitting or producing an RF exciter signal (or interrogation signal) and receiving response signals generated by active security tags in the EAS detection zone 350. In some scenarios, the same antenna can be used for both receive and transmit functions. Similarly, pedestal 202b can include at least one antenna 220b suitable for transmitting or producing an RF exciter signal (or interrogation signal) and receiving response signals generated by security tags in the EAS detection zone 350.

In some scenarios, a single antenna can be used in each pedestal. The single antenna is selectively coupled to the EAS receiver. The EAS transmitter is operated in a time multiplexed manner. However, it can be advantageous to include two antennas in each pedestal as shown in FIG. 2, with an upper antenna positioned above a lower antenna.

The antennas located in the pedestals 202a, 202b are electrically coupled to a system controller 210. The system controller 210 controls the operation of the monitoring system 116 to perform EAS functions as described herein. The system controller 210 can be located within a base 206a, 206b of one of the pedestals 202a, 202b or can be located within a separate chassis at a location nearby to the pedestals. For example, the system controller 210 can be located in a ceiling just above or adjacent to the pedestals 202a, 202b.

As noted above, the EAS detection system comprises an RFID type EAS detection system. As such, each antenna is used to generate an RFID signal which serves as an interrogation signal. The interrogation signal causes the security tag 104 to generate and transmit an RFID response signal. The RFID response signal includes a unique identifier of the security tag 104 and/or object to which it is coupled. The RFID response signal is used to indicate a presence of the security tag within the EAS detection zone (or interrogation zone) 350. As noted above, the same antenna contained in a pedestal 202a, 202b can serve as both the transmit antenna and the receive antenna.

A camera 108a, 108b may be coupled to one or more of the pedestals 202a, 202b. Additionally or alternatively, a camera can be located in the ceiling just above the pedestals 202a, 202b and/or mounted on a wall adjacent to the pedestals 202a, 202b. The camera(s) 108a, 108b is(are) arranged such that their Field Of View ("FOV") cover(s) the EAS detection zone 350. The camera(s) 108a, 108b is(are) provided to capture images/videos of the EAS detection zone when an active security tag 104 is detected therein. These images/videos are used to identify when an alarm issued by the monitoring system 116 is a false alarm. False alarms can occur when active security tags are carried passed the pedestals 202a, 202b within the RSF 150 and/or when active security tags are disposed on display equipment located within the read range of the monitoring system 116 as discussed below in relation to FIG. 8.

Figure 4:
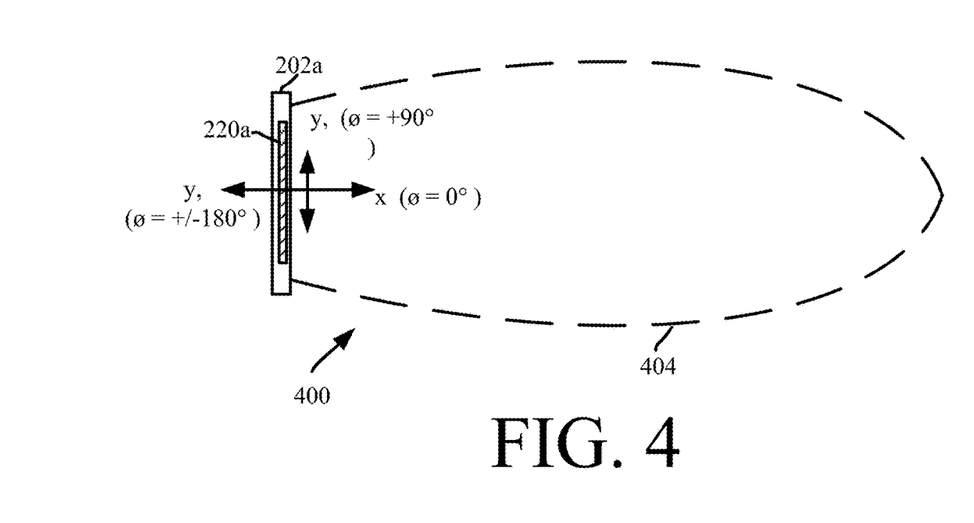
FIGS. 4 and 5 are drawings which are useful for understanding fields of antennas which are used in the monitoring system of FIGS. 2-3.
Figure 5:
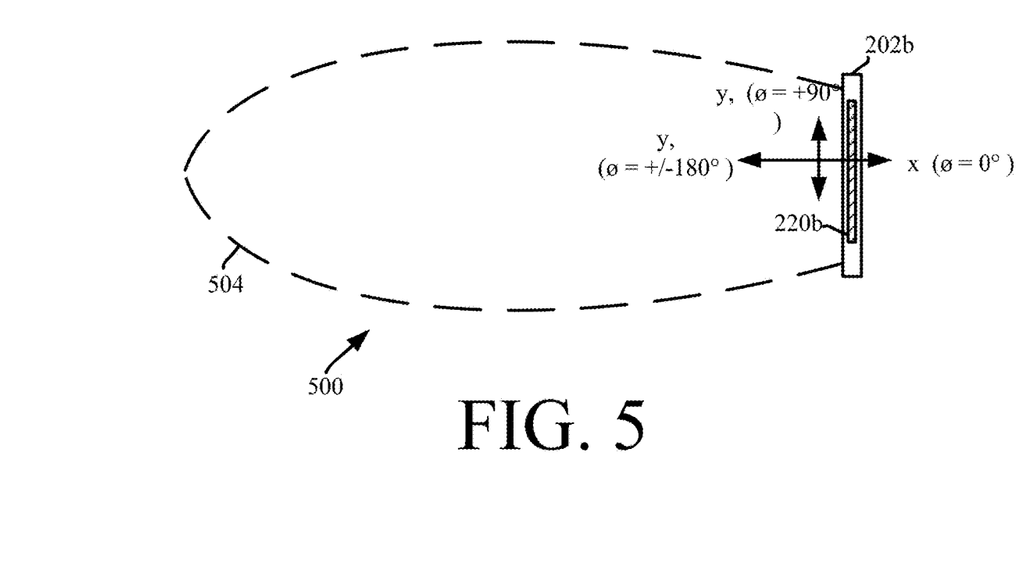

Referring now to FIGS. 4 and 5, there are shown illustrative antenna patterns 400, 500 for antennas 220a, 220b contained in pedestals 202a, 202b. As is known in the art, an antenna radiation pattern is a graphical representation of the radiating (or receiving) properties for a given antenna as a function of space. The properties of an antenna are the same in a transmit mode and a receive mode of operation. As such, the antenna radiation pattern shown is applicable for both transmit and receive operations as described herein. The illustrative antenna field patterns 400, 500 shown in FIGS. 4-5 are azimuth plane patterns representing the antenna pattern in the x, y coordinate plane. The azimuth pattern is represented in polar coordinate form and is sufficient for understanding the inventive arrangements. The azimuth antenna field patterns shown in FIGS. 4-5 are a useful way of visualizing the direction in which the antennas 220a, 220b will transmit and receive signals at a particular transmitter power level.

Figure 6:
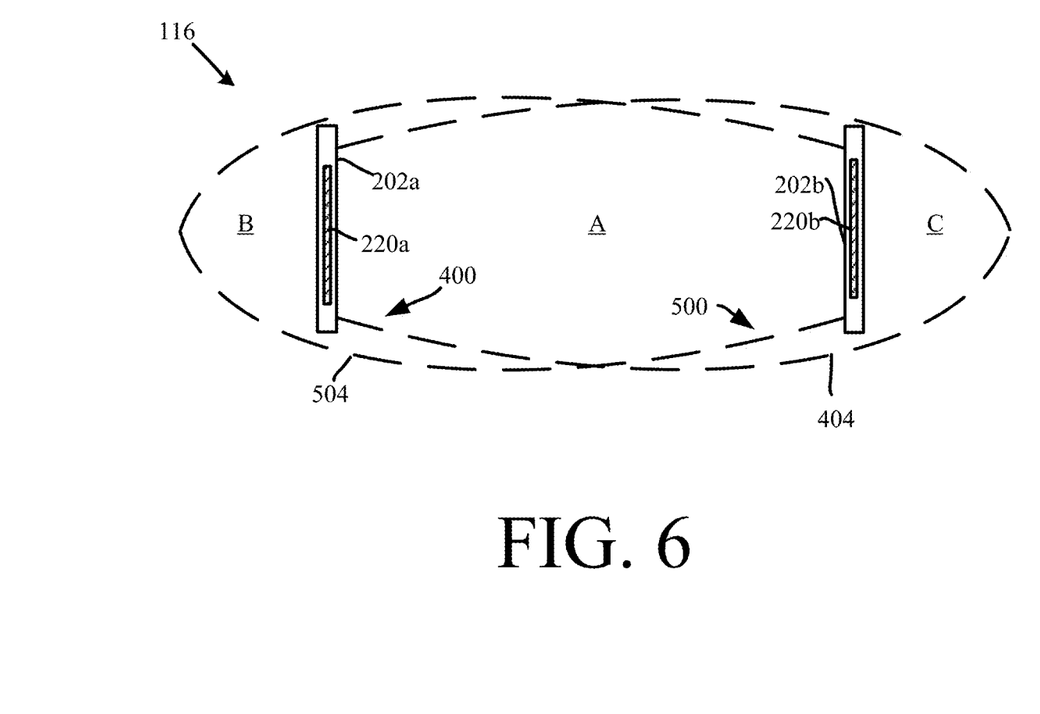
FIG. 6 is an illustration showing the antenna fields of the monitoring system of FIGS. 2-3 overlapping each other.

The antenna field pattern 400 shown in FIG. 4 includes a lobe 404 with a peak at ø=0°. Conversely, the antenna field pattern 500 shown in FIG. 5 includes a lobe 504 with its peak at ø=180°. In the monitoring system 116, each pedestal 202a, 202b is positioned so that the lobe of an antenna contained therein is directed into the EAS detection zone (or interrogation zone) 350. Accordingly, a pair of pedestals 202a, 202b in the monitoring system 116 produce overlap in the antenna field patterns 400, 500, as shown in FIG. 6. Notably, the antenna field patterns 400, 500 shown in FIG. 6 are scaled for purposes of understanding the present solution. In particular, the patterns show the outer boundary or limits of an area in which an exciter signal of particular amplitude applied to antennas 202a, 202b will produce a detectable response in an EAS security tag. However, it should be understood that a security tag within the bounds of at least one antenna field pattern 400, 500 will generate a detectable response when stimulated by an exciter signal.

The overlapping antenna field patterns 400, 500 in FIG. 6 include an area A where there is overlap of lobes 404, 504. It can also be observed in FIG. 6 that the lobe 404 of pedestal 202a extends past the other pedestal 202b and into area C. Similarly, the lobe 504 of pedestal 202b extend past the other pedestal 202a and into area B.

Area A between pedestals 202a, 202b defines at least a portion of the EAS detection zone 350 in which active security tags 104 should cause the monitoring system 116 to generate an alarm response. Security tags in area A are stimulated by energy associated with an exciter signal within the lobes 404, 504 and will produce a response which can be detected at each antenna. The response produced by a security tag in area A is detected within the lobes of each antenna and processed in the system controller 210. This response signal is referred to herein as a "security tag signal" or an "RFID response signal".

Notably, a security tag in areas B or C will also be excited by the antennas 202a, 202b. The RFID response signal produced by a security tag in these areas B and C will also be received at one or both antennas, and therefore will cause false alarming by the monitoring system 116.

As noted above in relation to FIGS. 2-3, at least one camera 108a, 108b is advantageously mounted on, above or adjacent to pedestal 102a and/or 102b. Cameras are well known in the art, and therefore will not be described herein. Any known or to be known camera can be used herein without limitation. For example, camera chips with embedded Artificial Intelligence ("AI") may be employed here. The camera chips can include, but are not limited to, a smart camera with embedded AI available from Horizon Robotics of Beijing, China. Generally, each camera 108a, 108b is configured to: locate and track people, packages, objects and environmental conditions (e.g., door motion, the presence of a shopping cart, the presence of a restocking cart, the presence of a pallet of item, and/or the presence of another metal or glass item) in an area around the respective pedestal; and capture images of the area around the respective pedestal. Metadata is generated by the camera that indicates (1) the presence of a detected person/package/object in at least area A, (2) a location of the detected person/package/object in at least area A, (3) the type of person/package/object in at least area A, and/or (3) environmental conditions (e.g., motion of door 204) in at least area A. The term "metadata", as used herein, refers to a set of data that describes or gives information about other data (e.g., about the contents of images and/or videos). This metadata can be communicated to the system controller 210 for use in identifying false alarming by the monitoring system 116. The cameras can also capture images. These images may or may not be communicated to the system controller 210 in addition to the metadata depending on a given application.

The area covered by the camera can include at least area A. Notably, the cameras are not shown in FIG. 6 for simplicity of illustration. For example in some scenarios, camera 108a is disposed on the front of pedestal 202a so that it covers area A. Similarly, camera 108b is disposed on the front of pedestal 202b so that it also covers area A. Each camera 108a-108b is shown in FIG. 2 as being located in the middle of the vertically elongate pedestals. However, each camera can be located at any location on the respective pedestal in accordance with a given application. For example, each camera 108a, 108b is located at the top center of the pedestal. Additionally, any number of cameras can be provided with each pedestal. The total number of cameras on each pedestal is selected in accordance with a given application. The present solution is not limited to the particulars of this example. As noted above, the cameras can alternatively reside in the ceiling or on a wall adjacent to the pedestals.

The camera(s) are controlled and provided power from the RFID reader or system controller 210. 1-wire technology may be employed to provide data, power and RF. In some scenarios, the camera(s) use less than 1 mW continuous and the data rate of the metadata is low enough to be supported by 1-wire technology. So, one or more cameras may be added to a 1-wire bus of system 100 for easy integration with an RFID reader.

The cameras provide the RFID reader or system controller 210 with real-time contextual information about the presence of people/packages/objects, the location of the same, and a direction of travel of the same. In the case that a person is detected by a camera, the camera can also provide real-time contextual information about (1) whether or not an item is in the EAS detection zone at the same time a person is in the EAS detection zone, (2) whether or not the person is carrying any items, (3) the type of person in the EAS detection zone (e.g., customer or employee), and/or (4) the types of the items detected in the EAS detection zone. The real-time contextual information is then used by the system controller 210, monitoring system 116, server 118, and/or computing device 124 to identify false alarm scenarios.

It should be noted that the two pedestals 202a, 202b can be activated at the same time or in a multiplexed manner. In the multiplexed scenarios, the pedestals 202a, 202b are activated in an alternating manner. For example, at a first time, pedestal 202a is activated and pedestal 202b is deactivated. At a second time, pedestal 202a is deactivated and pedestal 202b is activated.

Figure 7:
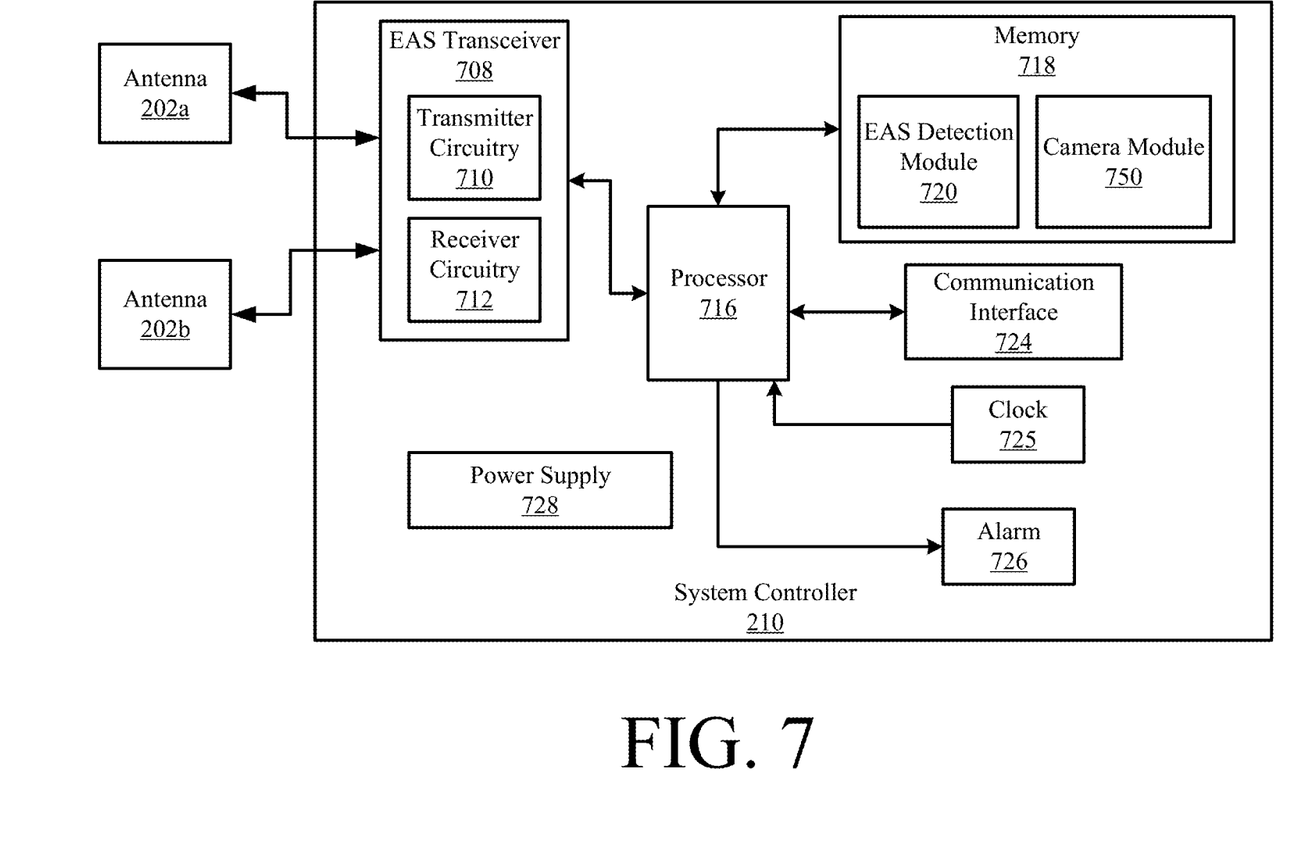
FIG. 7 is a block diagram of the system controller shown in FIGS. 2-3.

Referring now to FIG. 7, there is provided a block diagram that is useful for understanding the arrangement of the system controller 210. The system controller 210 comprises a processor 716 (such as a micro-controller or Central Processing Unit ("CPU")). The system controller also includes a computer-readable storage medium (such as memory 718) on which is stored one or more sets of instructions (e.g., software code) configured to implement one or more of the methodologies, procedures or functions described herein. The instructions can also reside, completely or at least partially, within the processor 716 during execution thereof by the system controller 210. The memory 718 and the processor 716 also can constitute machine-readable media. The term "machine-readable media", as used here, refers to a single medium or multiple media (e.g., a centralized or distributed database, and/or associated caches and servers) that store the one or more sets of instructions. The term "machine-readable media", as used here, also refers to any medium that is capable of storing, encoding or carrying a set of instructions for execution by the system controller 210 and that cause the system controller 210 to perform any one or more of the methodologies of the present disclosure.

The instructions (i.e., computer software) can include an EAS detection module 720 to facilitate EAS detection and perform methods for issuing alarms, identifying false alarms, and/or suppressing alarm issuance for false alarms, as described herein. The instructions can also include a camera module 750 to (a) cause images/videos to be captured by at least one camera coupled to or disposed in proximity to a pedestal, (b) cause the images/videos to be communicated from the camera to the system controller 210, (c) cause metadata to be communicated from the camera to the system controller 210, (d) receive data from external sensor devices, tag readers and other cameras disposed in proximity to display equipment located in a read range of the monitoring system(s) 116, (e) process images, videos, metadata, sensor data, and/or tag read data to determine whether or not a false alarm scenario exists, and/or (e) provide indications of false alarm scenarios to the processor 716 for use in controlling antenna's 202a, 202b. These instructions can also reside, completely or at least partially, within the processor 716 during execution thereof.

The system also includes at least one EAS transceiver 708, including transmitter circuitry 710 and receiver circuitry 712. The transmitter and receiver circuitry are electrically coupled to antenna 202a and the antenna 202b. A suitable multiplexing arrangement can be provided to facilitate both receive and transmit operation using a single antenna (e.g., antenna 202a or 202b). Transmit operations can occur concurrently at antennas 202a, 202b after which receive operations can occur concurrently at each antenna to listen for security tags which have been excited. Alternatively, transmit operations can be selectively controlled as described herein so that only one antenna is active at a time for transmitting interrogation signals. The antennas 202a, 202b can include an upper and lower antenna similar to those shown and described with respect to FIG. 2. Input signals applied to the upper and lower antennas can be controlled by transmitter circuitry 710 or processor 716 so that the upper and lower antennas operate in a phase aiding or a phase opposed configuration as required.

Additional components of the system controller 210 can include a communication interface 724 configured to facilitate wired and/or wireless communications from the system controller 210 to a remotely located EAS system server 118 or computing device 124. The system controller can also include a real-time clock 725 which is used for timing purposes, and an alarm 726 (e.g., an audible alarm, a visual alarm, or both) which can be activated when an active EAS security tag is detected thereby (e.g., in zone 350 of FIG. 3, zone A of FIG. 6, zone B of FIG. 6, and/or zone C of FIG. 6). A power supply 728 provides necessary electrical power to the various components of the system controller 210. The electrical connections from the power supply to the various system components are omitted in FIG. 7 so as to avoid obscuring the present solution.

Those skilled in the art will appreciate that the system controller architecture illustrated in FIG. 7 represents one possible example of a system architecture that can be used with the present solution. However, the present solution is not limited in this regard and any other suitable architecture can be used in each case without limitation. Dedicated hardware implementations including, but not limited to, application-specific integrated circuits, programmable logic arrays, and other hardware devices can likewise be constructed to implement the methods described herein. It will be appreciated that the apparatus and systems of various inventive embodiments broadly include a variety of electronic and computer systems. Some embodiments may implement functions in two or more specific interconnected hardware modules or devices with related control and data signals communicated between and through the modules, or as portions of an application-specific integrated circuit. Thus, the illustrative system is applicable to software, firmware, and hardware implementations.

Figure 8:
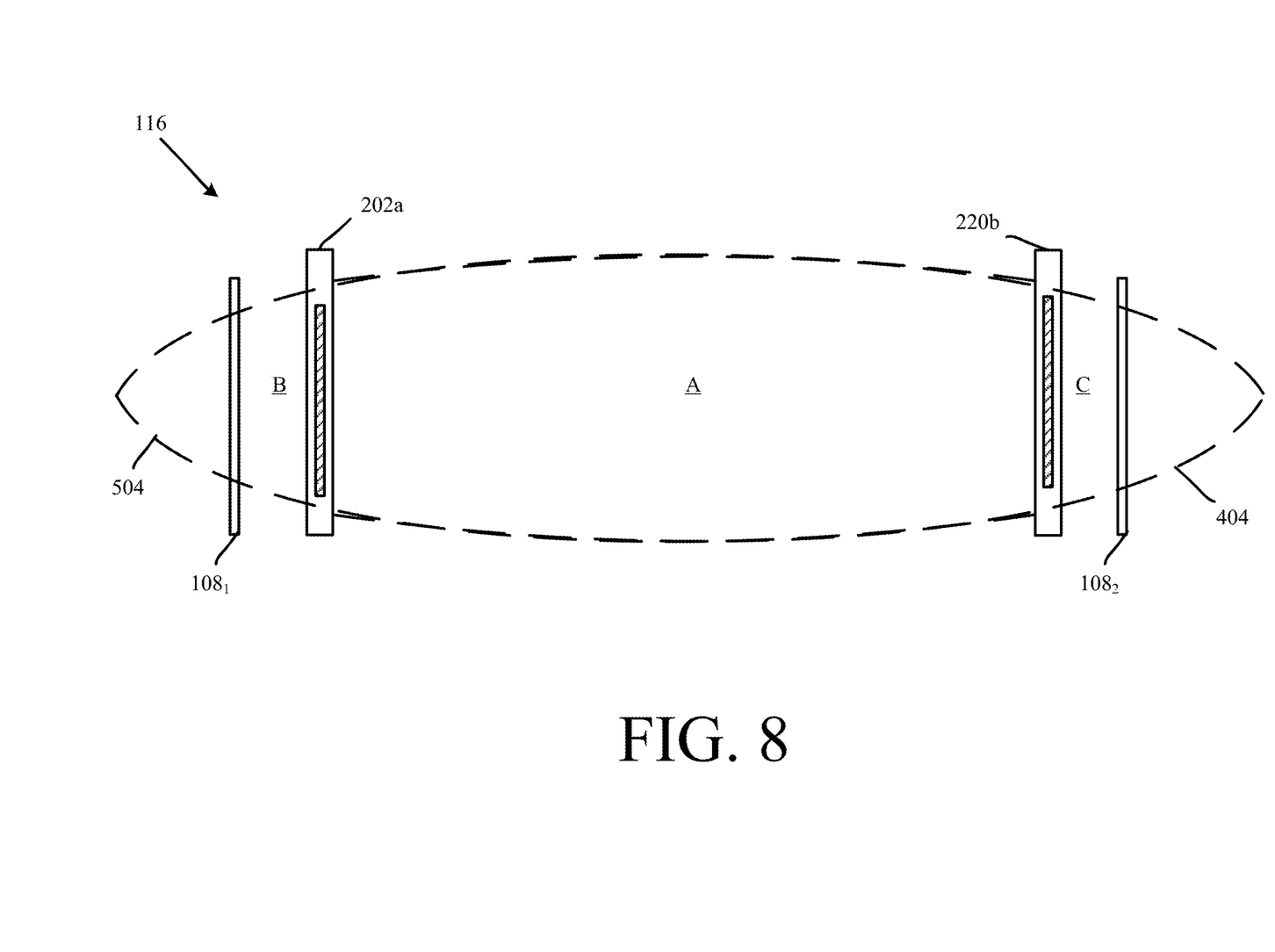
FIG. 8 is an illustration showing display equipment located in the tag read range of the monitoring system.

Referring now to FIG. 8, there is provided a diagram that is useful for understanding the present solution. As shown in FIG. 8, display equipment $108_1$, $108_2$ is placed in proximity to pedestals 202a, 202b. More specifically, display equipment $108_1$ is located in area B behind pedestal 220a, and display equipment $108_2$ is located in area C behind pedestal 220b. Accordingly, active security tags 104 disposed on the display equipment $108_1$, $108_2$ are read by the monitoring system 116. These reads cause the monitoring system 116 to issue alarms. These alarms are false alarms of theft since the items are not being carried through the EAS detection zone 350 or area A. The present solution provides a way to identify such false alarms with a relatively high degree of confidence and suppress alarm issuance in response to such false alarm identifications.

Figure 9:
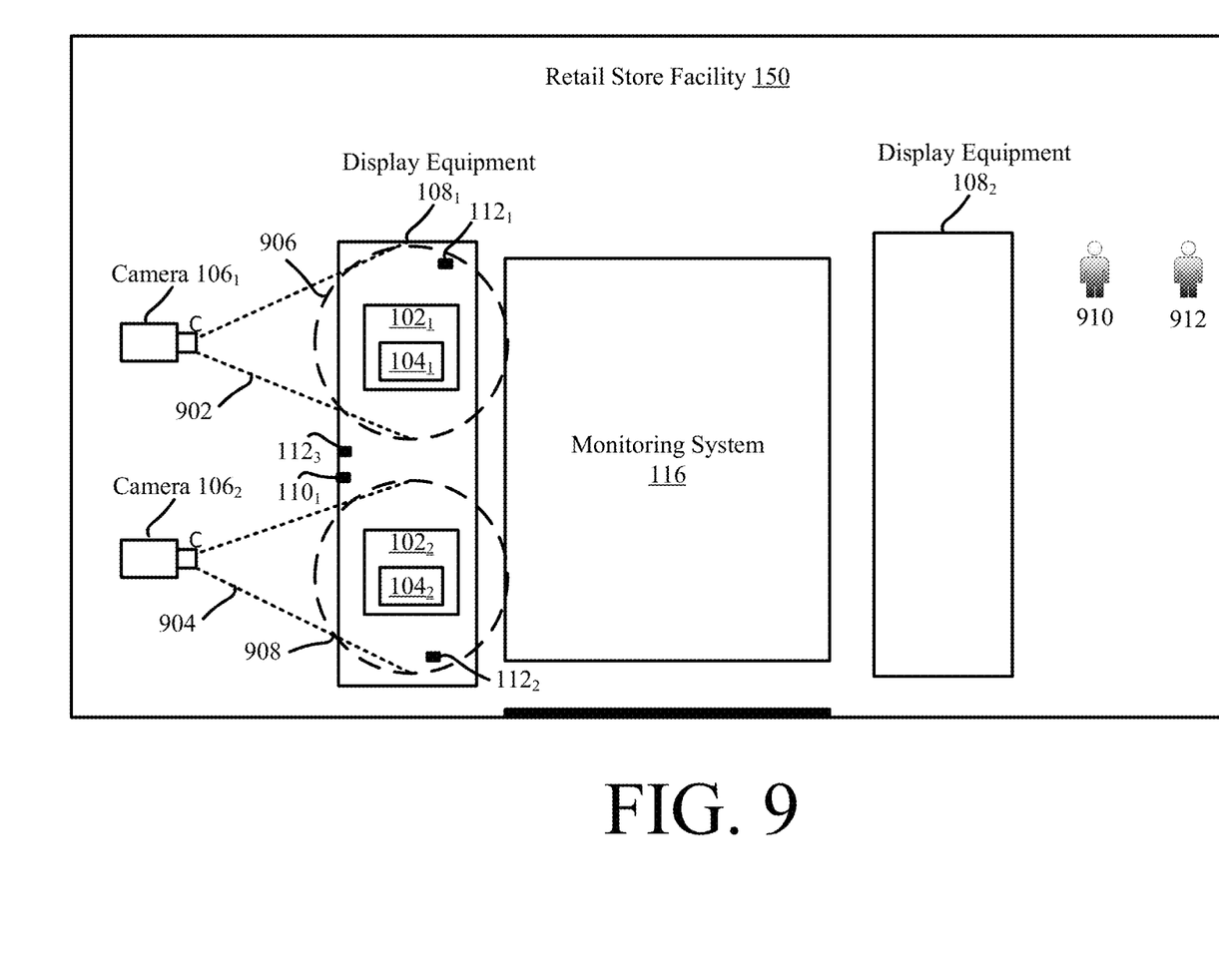
FIG. 9 is an illustration showing an illustrative layout for various components of the system shown in FIG. 1.

Referring now to FIG. 9, there is provided an illustration that is useful for understanding how the present solution identifies false alarm scenarios. As shown in FIG. 9, cameras $106_1$, $106_2$ are provided in the ceiling above display equipment $108_1$. Camera $106_1$ has a FOV 902 coving a first portion of display equipment $108_1$, while camera $106_2$ has a FOV 904 covering a second portion of display equipment $108_1$. The area covered by FOV 902 defines a first monitored zone 906, and the area covered by FOV 904 defines a second monitored zone 908. The cameras $106_1$, $106_2$ can continuously capture images/videos, periodically capture images/videos at pre-defined times, and/or capture images/videos in response to trigger events. The trigger events can include, but are not limited to, motion detected by PIR sensors $112_1$, $112_2$ in the respective monitored zones 906, 908. The images/videos are stored in a datastore 120, 128 and/or 718 along with timestamps for later use in identifying false alarms.

A vibration sensor $112_3$ is also coupled to the display equipment $108_1$. The vibration sensor $112_3$ detects when the display equipment $108_1$ and/or objects $102_1$, $102_2$ disposed thereon are touched by a person 910, 912. Sensor data generated by the sensor $112_3$ is stored in a datastore 120, 128 and/or 718 along with timestamps for later use in identifying false alarms.

The person can include a customer 910 or an employee 912. The sensor data generated by sensors $112_1$, $112_2$, $112_3$ is not sufficient for classifying the person as a customer or an employee. However, the person can be classified based on results of an analysis of the image/video data generated by cameras $106_1$, $106_2$. The person's classification can also assist in identifying false alarm scenarios as described below.

A tag reader $110_1$ may further be disposed on or adjacent to the display equipment 108. The tag reader $110_1$ has a read range that includes the first and second monitored zones 906, 908. The tag reader $110_1$ reads active security tags in the first and second monitored zones 906, 908 on a continuous basis, a periodic basis at pre-defined intervals, or in response to trigger events (e.g., N seconds or minutes after an image capture by camera $106_1$ or $106_2$). Tag read data generated by tag reader $110_1$ is then stored in the data store 120, 128 and/or 718 along with timestamps for later use in identifying false alarms as described below.

Figure 10:
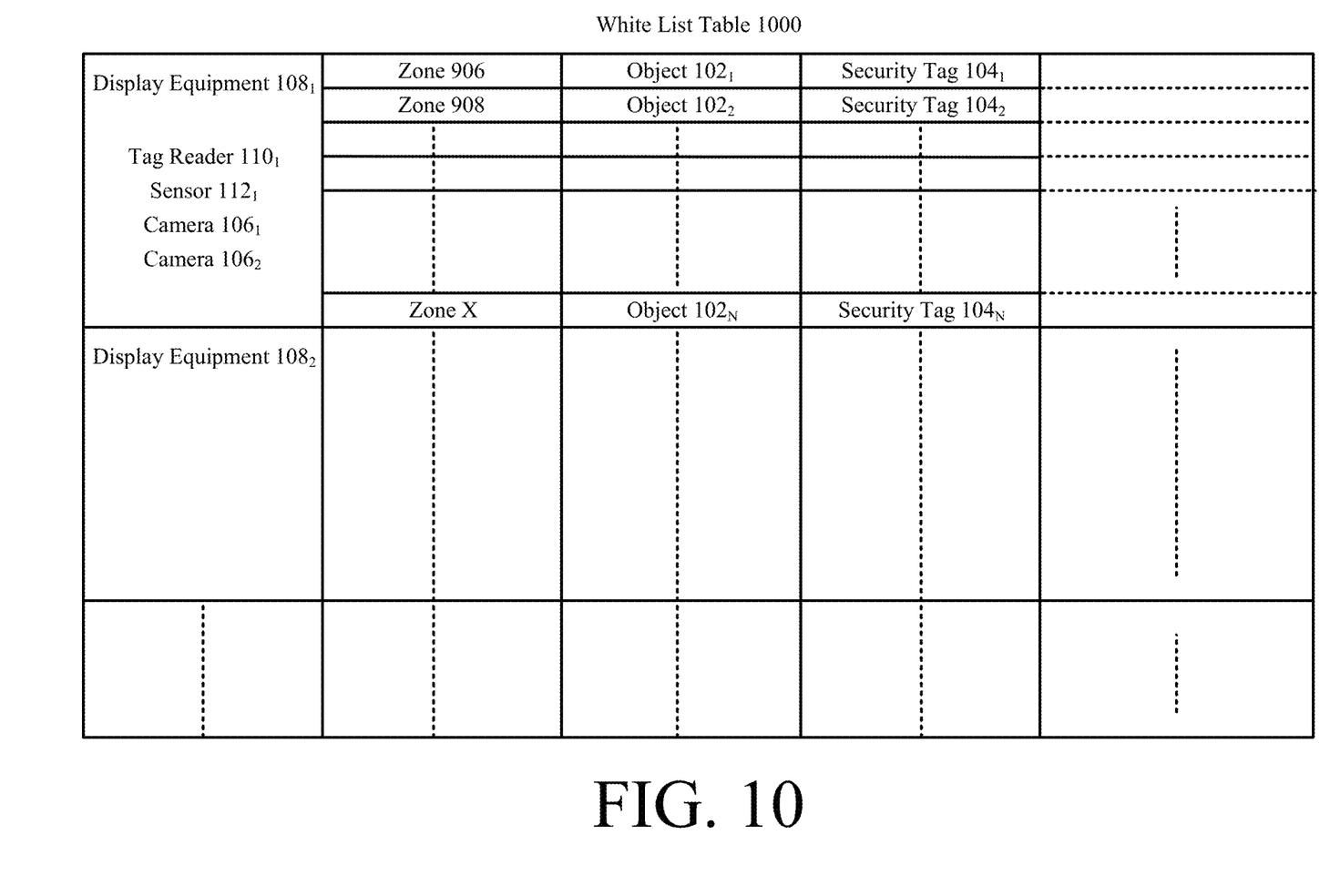
FIG. 10 shown an illustrative white list table.

A white list of objects can be manually created by a person (e.g., an employee operator) or specified by a planogram. Alternatively, the white list of objects is generated based on the tag read data generated by monitoring system 116 and/or tag reader $110_1$ during off or non-business hours. The white list provides a way to determine when an alarm caused by a white listed object is a false alarm. An illustration of an illustrative white list stored as a table 1000 in a data store is provided in FIG. 10. As shown in FIG. 10, the white list table 1000 comprises various information for each piece of display equipment $108_1$, $108_2$ located in a read range of the monitoring system 116. This information includes, but is not limited to, identifications for monitored zones 906, 908, . . . , X associated with the respective display equipment, identification information for objects $102_1$, $102_2$, . . . , $102_N$ disposed on the respective display equipment, identification information for security tags $104_1$, $104_2$, . . . , $104_N$ coupled to the objects, and identification information for other devices 106, 110, 112 associated with the respective display equipment. The table is used to access respective image/video, sensor data and/or tag read data when an active white listed tag is detected by the EAS detection system 114. The accessed image/video data, sensor data and/or tag read data is then used to determine whether or not a false alarm scenario exists in relation to the white listed tag's detection by the EAS detection system 114, as discussed below.

Another aspect of the present solution is to allow the system 100 to auto-configure itself so as to minimize time spent setting it up. Calibration or registration marks can be added to the zones to be monitored. A mobile device (e.g., a smart phone or tablet) can be provided that allows easy marking of monitored zones. If enough tag readers are placed in an area that allows a tag's location to be determined within a relatively small zone, then security tags can be associated with relatively small monitored zones which helps to increase the confidence of a false alarm identification.

Illustrative Methods for Operating An EAS Detection System

Figure 11A:
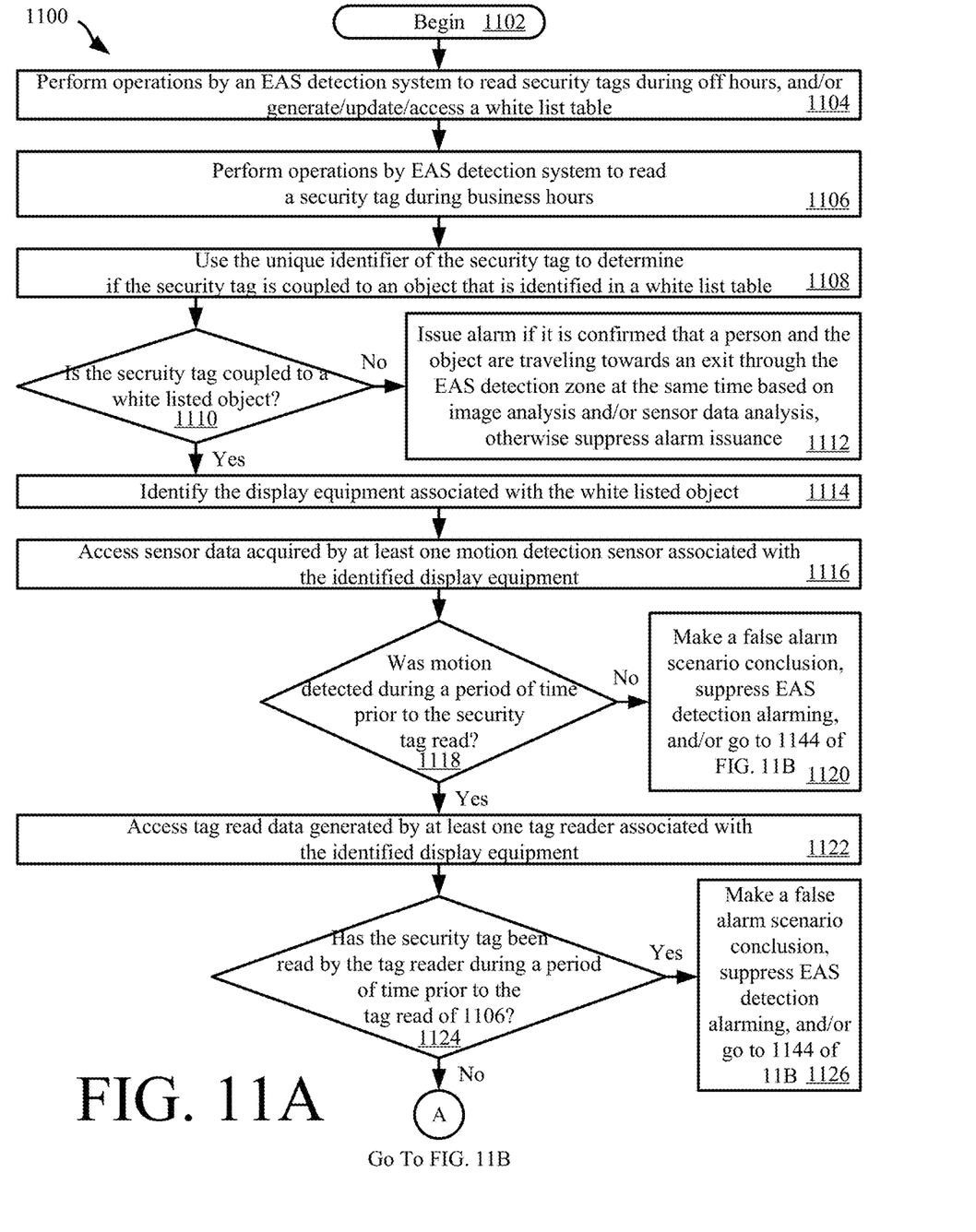
FIGS. 11A-11C (collectively referred to as "FIG. 11") is a flowchart of an illustrative method for operating an EAS detection system.

Referring now to FIG. 11, there is provided a flow diagram of an illustrative method 1100 for operating an EAS detection system (e.g., EAS detection system 114 of FIGS. 1-8). Method 1100 begins with $110_2$ and continues with 1104 where the EAS detection system performs operations to read security tags during off hours and/or generate/update/access a white list table (e.g., white list table 1000 of FIG. 10) in accordance with the tag reads. Next in 1106, the EAS detection system performs operations to read a security tag (e.g., security tag 104 of FIG. 1, $104_1$ of FIG. 9, or $104_2$ of FIG. 9) during business hours. A unique identifier for the security tag is included in the RFID response signal. The unique identifier is used in 1108 to determine if the security tag is coupled to an object that is identified in the white list table. 1108 can involve comparing the unique identifier contained in the RFID response signal with security tag identifiers contained in the white list table to determine if a match exists therebetween. If so, the object (e.g., object 102 of FIG. 1, $102_1$ of FIG. 9 or $102_2$ of FIG. 9) to which the security tag is coupled is considered a white listed object.

If the security tag is not coupled to a white listed object [1110:NO], then 1112 is performed where an alarm may be issued by the EAS detection system. The alarm is issued if the system (e.g., system 100 of FIG. 1) confirms that a person and the object are traveling towards an exit through the EAS detection zone (e.g., EAS detection zone 350 of FIG. 3 or zone A of FIG. 6) at the same time. This confirmation can be made based on image analysis and/or sensor data analysis. Techniques for making such a confirmation are known in the art, and therefore will not be described herein. Any known or to be known technique for making such a confirmation can be used herein. Otherwise, the alarm issuance is suppressed.

If the security tag is coupled to the white listed object [1110:YES], then 1114 is performed where the display equipment (e.g., display equipment 108 of FIG. 1, $108_1$ of FIG. 8, or $108_2$ of FIG. 8) associated with the white listed object is identified using the white list table. Sensor data is then accessed for at least one motion detection sensor (e.g., vibration sensor $112_3$ of FIG. 9) associated with the identified display equipment, as shown in 1116. The sensor data is analyzed to determine if motion was detected during a period of time (e.g., 5 minutes) prior to the tag read in 1106. If not [1118:NO], then 1120 is performed where a false alarm scenario conclusion is made, EAS detection alarming is suppressed, and/or method 1100 continues with 1144 of FIG. 11B. In 1144, method 1100 ends or other processing is performed (e.g., return to 1106).

If so [1118:YES], then $112_2$ is performed where tag read data is access for at least one tag reader (e.g., tag reader 110 of FIG. 1 or $110_1$ of FIG. 9) associated with the identified display equipment. The tag read data is analyzed to determine if the security tag has been read by the tag reader during a period of time (e.g., 5-60 minutes) prior to the tag read of 1106. If so [1124:YES], then 1126 is performed where a false alarm scenario conclusion is made, EAS detection alarming is suppressed, and/or method 1100 continues with 1144 of FIG. 11B. In 1144, method 1100 ends or other processing is performed (e.g., return to 1106).

Figure 11B:
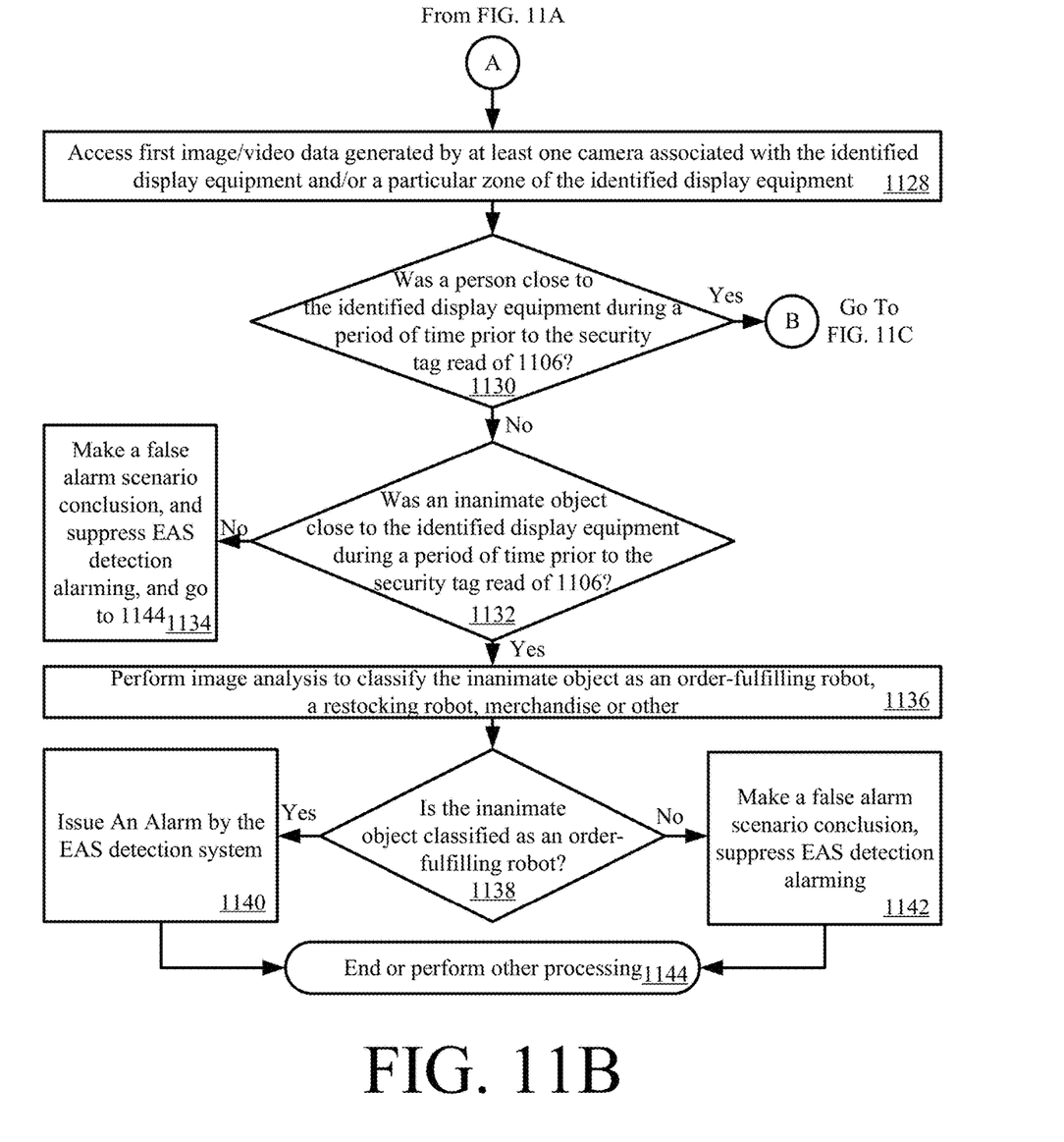

If not [1124:NO], then method 1100 continues with 1128 of FIG. 11B. As shown in 11B, 1128 involves accessing first image/video data generated by at least one camera (e.g., camera 106 of FIG. 1, $106_1$ of FIG. 9 and/or $106_2$ of FIG. 9) associated with the identified display equipment and/or a particular zone (e.g., monitored zone 906 or 908 of FIG. 9) of the identified display equipment. The first image/video data is analyzed to determine if a person (e.g., person 910 or 912 of FIG. 9) was close to (e.g., within in 2 feet of) the identified display equipment during a period of time (e.g., 5-60 minutes) prior to the tag read of 1106. If so [1130:YES], method 1100 continues to 1146 of FIG. 11C which will be discussed below. If not [1130:NO], then method 1100 continues with 1132 where a determination is made as to whether an inanimate object was close to (e.g., within in 2 feet of) the identified display equipment during a period of time prior to the tag read of 1106. If not [1132:NO], then 1134 is performed where a false alarm scenario conclusion is made, EAS detection alarming is suppressed, and/or method 1100 continues with 1144 of FIG. 11B. In 1144, method 1100 ends or other processing is performed (e.g., return to 1106).

If so [1132:YES], then 1136 is performed where image analysis is performed to classify the inanimate object as an order-fulfilling robot, a restocking robot, merchandise or other object (e.g., a shopping cart). If the inanimate object is classified as an order-fulfilling robot [1138:YES], then 1140 is performed where the EAS detection system issues an alarm. Otherwise [1138:NO], 1142 is performed where a false alarm scenario conclusion is made, EAS detection alarming is suppressed, and/or method 1100 continues with 1144 of FIG. 11B. In 1144, method 1100 ends or other processing is performed (e.g., return to 1106).

Figure 11C:
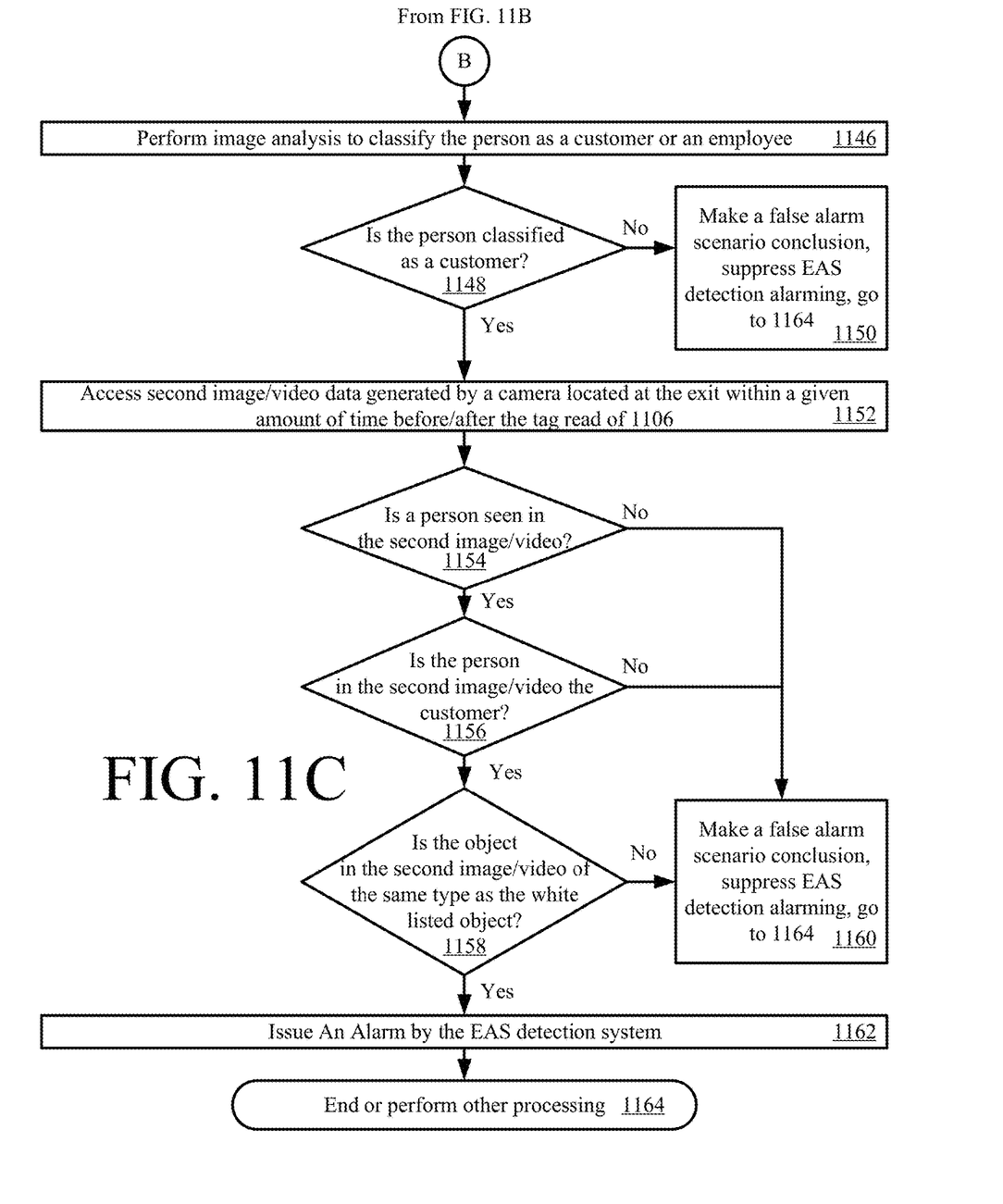

Referring now to FIG. 11C, method 1100 continues with 1146 when the image/video analysis of 1128 indicates that a person is close to (e.g., within 2 feet of) the identified display equipment during the period of time prior to the tag read of 1106. In 1146, image analysis is performed to classify the person as a customer or an employee.

If the person is classified as an employee [1148:NO], then 1150 is performed where a false alarm scenario conclusion is made, EAS detection alarming is suppressed, and/or method 1100 continues with 1164. In 1164, method 1100 ends or other processing is performed (e.g., return to 1106).

If the person is classified as a customer [1148:YES], then 1152 is performed where second image/video data is accessed for a camera (e.g., camera 108a and/or 108b of FIGS. 2-3) located at the exit. The accessed second image/video data including data generated by the camera within a given amount of time (e.g., 1 minute) before and after the tag read of 1106. The second image/video data is analyzed to determine if a person seen therein. If not [1154:NO], then method 1100 continues with 1160 which will be discussed below.

If so [1154:YES], then a decision is made as to whether the person in the second image/video is the customer seen in the first image/video. If not [1156:NO], then method 1100 continues with 1160 which will be discussed below.

If so [1156:YES], then a decision is made as to whether the object in the second image/video is of the same type as the white listed object. If not [1158:NO], then method 1100 continues with 1160 where a false alarm scenario conclusion is made, EAS detection alarming is suppressed, and/or method 1100 continues with 1164. In 1164, method 1100 ends or other processing is performed (e.g., return to 1106).

If so [1158:YES], then 1162 is performed where an alarm is issued by the EAS detection system. Subsequently, 1164 is performed where method 1100 ends or other processing is performed (e.g., return to 1106).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating an Electronic Article Surveillance ("EAS") detection system, comprising:
   detecting, by the EAS detection system, an alarm of a tag of the system; and
   determining whether or not the alarm is a false alarm by:
      determining whether the alarmed tag is associated with an object identified in a list of objects on display within a detection zone of the system; and
      performing the following operations when a determination is made that the alarmed tag is coupled to an object identified in the list:
         accessing sensor data generated by at least one sensor device disposed on or near display equipment associated with the object identified in the list;
         processing the sensor data to determine whether a person was within a defined distance range of the alarmed tag during a period of time immediately preceding the detecting;
         concluding that the alarm is a false alarm when the sensor data indicates that the person was not within the defined distance range of the alarmed tag during the period of time; and
      suppressing an issuance of the alarm by the EAS detection system in response to the false alarm determination.

2. The method according to claim 1, further comprising performing operations by the EAS detection system to read security tags coupled to objects on display within the detection zone during off hours and generate the list.

3. The method according to claim 1, further comprising outputting an alarm by the system when a determination is made that the alarmed tag is not coupled to the object identified in the list.

4. The method according to claim 1, wherein the at least one sensor device comprises at least one of a motion sensor and a camera.

5. The method according to claim 1, further comprising using the sensor data to classify the person as a customer or employee when a determination is made that a person was within the defined distance range of the alarmed tag during the period of time.

6. The method according to claim 5, further comprising concluding that the alarm is a false alarm when the person is classified as an employee.

7. The method according to claim 5, further comprising concluding that the alarm is a real alarm when the person is classified as a customer.

8. The method according to claim 5, further comprising concluding that the alarm is a false alarm when (a) the person is classified as a customer and (b) image analysis indicates the customer is not an individual present in the EAS detection zone at the time of the detecting or that no individual was present in the EAS detection zone at the time of the detecting.

9. The method according to claim 5, further comprising concluding that the alarm is a false alarm when (a) the person is classified as a customer and (b) image analysis indicates that the object to which the active security tag is coupled is not the same as the object present in the EAS detection zone at the time of the detecting.

10. The method according to claim 1, further comprising using the sensor data to determine whether an inanimate object was within the defined distance range of the alarmed tag during the period of time immediately preceding the detecting.

11. The method according to claim 10, further comprising concluding that the alarm is a false alarm when a determination is made that an inanimate object other than an order-fulfilling robot was within the defined distance range of the alarmed tag during the period of time.

12. A system, comprising:
a processor; and
a non-transitory computer-readable storage medium comprising programming instructions that are configured to cause the processor to implement a method for operating an Electronic Article Surveillance ("EAS") detection system, wherein the programming instructions comprise instructions to:
cause the EAS detection system to detect an active security tag in an EAS detection zone for causing issuance of an alarm;
determine whether or not the alarm is a false alarm by:
determining whether the active security tag is coupled to an object identified in a list of objects on display within a detection zone of the system; and
performing the following operations when a determination is made that the active security tag is coupled to an object identified in the list of objects:
accessing sensor data generated by at least one sensor device disposed on or near display equipment associated with the object identified in the list of objects;
processing the sensor data to determine whether a person was within a defined distance range of the active security tag during a period of time immediately preceding the detecting; and
concluding that the alarm is a false alarm when the sensor data indicates that the person was not within the defined distance range of the active security tag during the period of time; and
suppress the issuance of the alarm by the EAS detection system in response to the false alarm determination.

13. The system according to claim 12, wherein the programming instructions further comprise instructions to cause the EAS detection system to read security tags coupled to objects on display within the detection zone during off hours and generate the list.

14. The system according to claim 12, wherein the programming instructions further comprise instructions to cause the EAS detection system to issue the alarm when a determination is made that the alarmed tag is not coupled to the object identified in the list of objects.

15. The system according to claim 12, wherein the at least one sensor device comprises at least one of a motion sensor and a camera.

16. The system according to claim 12, wherein the programming instructions further comprise instructions to use the sensor data to classify the person as a customer or employee when a determination is made that a person was within the defined distance range of the alarmed tag during the period of time.

17. The system according to claim 16, wherein the programming instructions further comprise instructions to conclude that the alarm is a false alarm when the person is classified as an employee.

18. The system according to claim 16, wherein the programming instructions further comprise instructions to conclude that the alarm is a real alarm when the person is classified as a customer.

19. The system according to claim 16, wherein the programming instructions further comprise instructions to conclude that the alarm is a false alarm when (a) the person is classified as a customer and (b) image analysis indicates the customer is not an individual present in the EAS detection zone at the time of the detecting or that no individual was present in the EAS detection zone at the time of the detecting.

20. The system according to claim 16, wherein the programming instructions further comprise instructions to conclude that the alarm is a false alarm when (a) the person is classified as a customer and (b) image analysis indicates that the object to which the alarmed tag is coupled is not the same as the object present in the EAS detection zone at the time of the detecting.

21. The system according to claim 12, wherein the programming instructions further comprise instructions to use the sensor data to determine whether an inanimate object was within the defined distance range of the alarmed tag during the period of time immediately preceding the detecting.

22. The system according to claim 21, wherein the programming instructions further comprise instructions to conclude that the alarm is a false alarm when a determination is made that an inanimate object other than an order-fulfilling robot was within the defined distance range of the alarmed tag during the period of time.

* * * * *